United States Patent [19]

Posnansky et al.

[11] 4,421,102
[45] Dec. 20, 1983

[54] PROCESS AND APPARATUS FOR HEATING A TRANSPARENT, GASEOUS MEDIUM BY MEANS OF CONCENTRATED SOLAR RADIATION

[76] Inventors: Mario Posnansky, Melchenbühlweg 18, 3006 Bern (Canton of Berne); Ruedi Kriesi, Mühlebühl 1, 9100 Herisau (Canton of Appenzell), both of Switzerland

[21] Appl. No.: 192,521
[22] PCT Filed: May 2, 1979
[86] PCT No.: PCT/CH79/00064
  § 371 Date: Jan. 2, 1980
  § 102(e) Date: Dec. 27, 1979
[87] PCT Pub. No.: WO79/01021
  PCT Pub. Date: Nov. 29, 1979

[30] Foreign Application Priority Data
May 2, 1978 [CH] Switzerland .................. 4772/78

[51] Int. Cl.³ ............................................. F24J 3/02
[52] U.S. Cl. .................................. 126/438; 176/443; 176/441; 176/448; 176/901
[58] Field of Search .............. 126/441, 443, 449, 442, 126/448, 438, 901

[56] References Cited
U.S. PATENT DOCUMENTS
2,133,649 10/1938 Abbot .
3,239,000 3/1966 Meagher .................... 126/448
4,015,584 4/1977 Haberman .
4,033,327 7/1977 Pei ............................ 126/443
4,136,674 1/1979 Korr ........................... 126/443

FOREIGN PATENT DOCUMENTS
2622023 12/1977 Fed. Rep. of Germany .
2274800 1/1976 France .
2337857 8/1977 France .

Primary Examiner—Carroll B. Dority, Jr.
Attorney, Agent, or Firm—Howard C. Miskin

[57] ABSTRACT

Between a device (15, 16) for supplying a transparent gaseous medium and a device (17, 18) for exhausting the heated medium, a number of quartz glass pipes (11) are disposed. Within each quartz glass pipe a number of glass strips, running parallel to one another, are accommodated. The adjacent glass strips are held by spacers at a distance which corresponds to the thickness of the glass strips. The glass strips are lightly tinted so that they absorb the incident radiation only partially. The coefficient of absorption of the glass strips amounts to about 0.1, so that about 90% of the incident solar radiation exits from the glass strips again and falls upon a further glass strip. In this way, the insolated energy is distributed over the entirety of the regions of the glass strips, so that all locations of the glass strips are heated evenly, and no location of the glass strips is overheated. The heat in the glass strips is transmitted to the gaseous medium flowing through inside the glass pipes and between the glass strips and is exhausted. This apparatus is particularly suitable for being disposed in a tower of a solar power plant in which the solar rays are directed at the top of the tower by means of a plurality of reflectors disposed on the ground.

18 Claims, 21 Drawing Figures

PROCESS AND APPARATUS FOR HEATING A TRANSPARENT, GASEOUS MEDIUM BY MEANS OF CONCENTRATED SOLAR RADIATION

The invention concerns a process for heating a transparent gaseous medium by means of highly concentrated solar radiation and an apparatus for carrying out this process.

Concentrated solar radiation is understood to mean the increasing of the power of the solar irradiation which strikes an object per unit of area. The power which is insolated upon an area of 1 m² with normal solar irradiation amounts to some 800 W. With solar radiation concentrated a thousandfold, the power which is insolated upon a m² is 1000×800 W equals 800 kW. The concentrating of the solar radiation can be achieved by lenses, concave reflectors, or, in the case of the known solar power plants, by a plurality of reflectors disposed on the ground which reflect the solar rays onto the top of a centrally disposed tower. References to such power plants are described in the report "Solar thermal Power Stations" of the international Symposium [sic] of Apr. 11–13, 1978 in Cologne of the Deutsche Forschungs- und Versuchsanstalt für Luft- und Raumfahrt (DFVLR) as well as in the paper "Solar Heated Air-Receivers" which was prepared for the international solar energy convention and the exhibition of July 28, to Aug. 1, 1975 in Los Angeles U.S.A. In the case of these known solar power plants, or in general in the case of installations which serve to convert solar energy into mechanical work by thermal means, there exists, as in other thermal power processes, the necessity of attaining the highest possible operating temperatures so that a high efficiency for the conversion of thermal energy into work results (Carnot vactor [sic]).

Normally, it follows from this that the working medium in thermal power processes at these high temperatures is gaseous at 600° to 1000° C. according to Brayton, Otto, Stirling and vaporous according to Rankine, for example, superheated steam of 500° to 600° C. The heating of a gaseous or vaporous medium by means of highly concentrated solar energy presents very particular difficulties in the types of solar power plants known today.

In the design of the radiation receivers, which are usually disposed on a tower, it can be observed that gigantic, voluminous structures, so-called cavity receivers, are built, in which the highly concentrated solar radiation, after passing through an entrance opening, is closed "defocused" and, in the interior, strikes pipes in which the working medium to be heated circulates.

Because of the poor coefficient of heat transmission at which heat is transferred from a solid body to a gaseous medium, large surfaces are necessary, on the one hand, for heating the gas with the known types of construction and processes. It follows from this that relatively great volume of the cavity, the inside surface of which is substantially greater than the area of the opening through which the rays are captured. On the other hand, very high temperatures are necessary for the heat-transferring pipe walls, which leads to the use of highly heat-resistant ceramic materials. Let these relationships be shown in the following with the aid of a brief calculation:

The radiation power entering the cavity amounts to $$Q_{str} = F_K \dot{q},$$

wherein $F_K$ = area of the beam of rays at the entrance of the cavity (m²)

$\dot{q}$ = radiation power density (kW/m²), as a rule 1000 to 2000 kW/m².

This radiation power must be transmitted to the gas via the pipe walls, which happens according to the following equation:

$$Q_{wal-gas} = F_R \alpha \Delta T_W \text{ minus } M,$$

$F_R$ being the total pipe surface available for the heat transfer, $\alpha$ being the coefficient of heat transmission from the wall to the medium, and $\Delta T_{W-M}$ being the difference in temperatures $T_{wall} - T_{medium}$.

Thus the result is the following relation $$(F_K \dot{q} = F_R \alpha \Delta T_{W-M})$$

For example, if an admissible difference in temperature of 400° C. between wall and medium is assumed, when, for example, the gas is supposed to be heated to 800° C., the wall would have a temperature of 1200° C., and if a very high coefficient of heat transmission $\alpha$ of 0.2 kW/m²° C. is taken as a basis, which is attainable only at very high pressure and gas speeds, then at a radiation density of 2000 kW/m², the result is the following aspect ratio between the total surface of the absorber pipe walls and the cross-section of the cavity opening $$\frac{F_R}{F_K} = \frac{\dot{q}}{\alpha \Delta T} = \frac{2000}{0.2 \cdot 400} = 25$$

If it were desired to reduce the size of this surface of the cavity, and thereby the volume and weight thereof, then somewhat more latitude is left for increasing the difference in temperature between the wall and the medium through use of ceramic materials, or one is compelled to use a liquid medium. Water is not suited for this because very high pressure is already produced at a temperature of only 300° C. Consequently, only liquid metals or, for example, liquid sodium enter into consideration, which permit substantially higher temperatures but have other decisive disadvantages. It is quite certain, however, that every attempt at energy transmission in the field of highly concentrated solar radiation is very difficult and complicated according to the previously known processes, in which connection even ceramic materials hardly withstand anymore the temperatures occurring then. It is the task of the invention to indicate a process and an apparatus, respectively, for transferring the energy contained in the concentrated solar radiation to a transparent, gaseous medium, the heat transfer taking place directly in the region of the greatest concentration of the beam of rays. Furthermore, the volume of the apparatus is meant to be reduced and the possibility offered that the use of high-strength ceramic materials can be dispensed with.

A further object is to heat the gas, for example, air, to a temperature of at least 600° C.

The invention is explained in more detail below, by way of example, with reference to the drawings.

Figure 1:
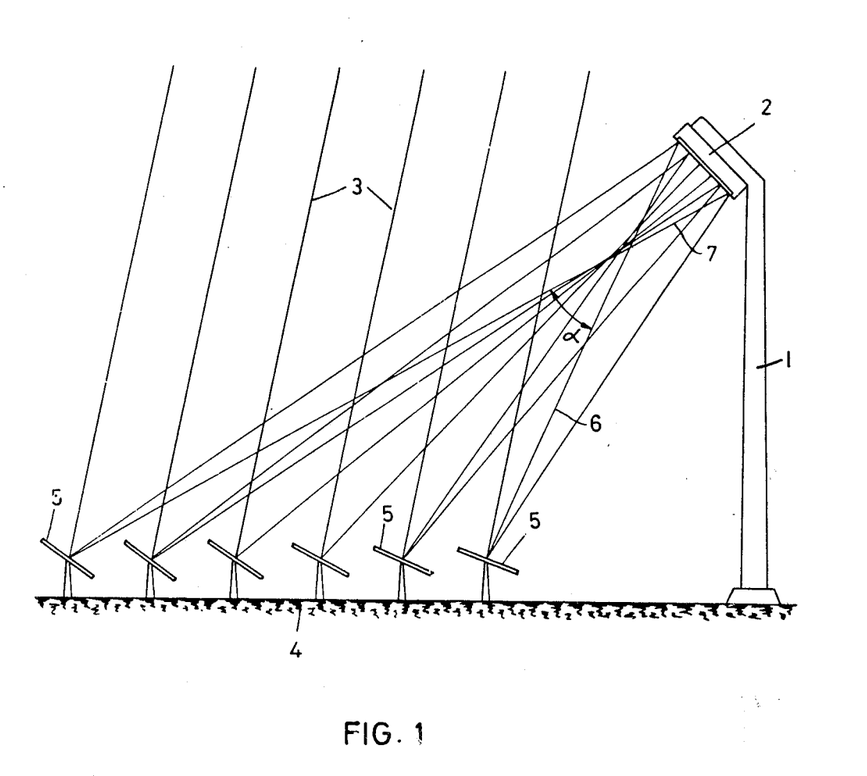
FIG. 1 shows part of a solar power plant with a tower, upon the upper region of which the solar radiation is concentrated by means of reflectors disposed on the ground.

The invention is explained below with the aid of examples of embodiments which are particularly suited for use in the tower of a solar power plant. FIG. 1 shows part of a solar power plant in a highly simplified representation. Disposed at the top of a tower 1 is a so-called ray receiver 2, for example, the apparatus depicted in FIGS. 2 and 3.

Figure 2:
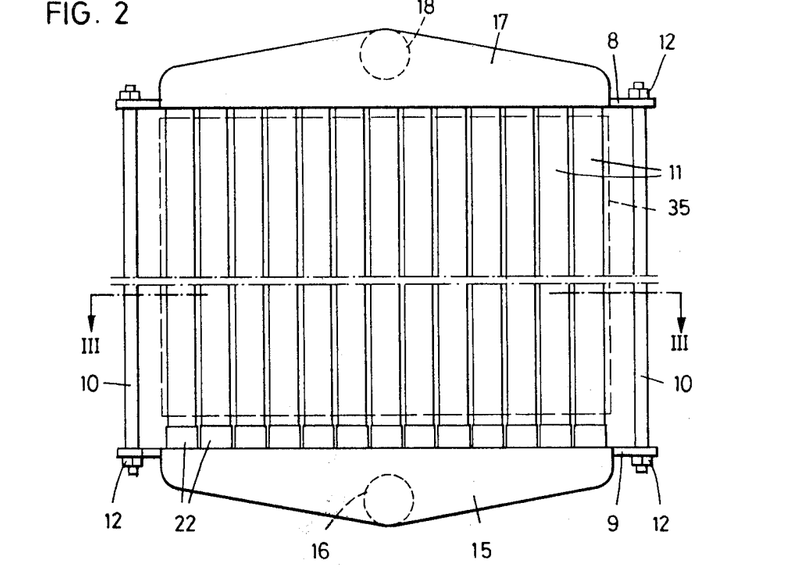
FIG. 2 shows an elevation of an apparatus according to the invention for heating a gaseous medium by means of concentrated solar radiation, disposed in the upper region of the tower according to FIG. 1.
Figure 3:
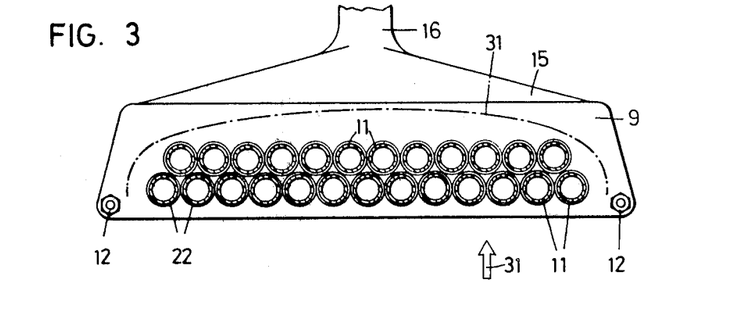
FIG. 3 shows a section along the line III—III of FIG. 2.

Disposed in the interior of the tubular tower 1 are a non-depicted supply conduit for a transparent, gaseous medium, e.g., air, to be heated, and a non-drawn exhaust conduit for the air heated in the said apparatus. The incident solar radiation is indicated by arrows 3 and is concentrated on the face of the apparatus by reflectors 5 disposed on the ground 4. The apparatus is slantingly aligned in such a way that the straight line perpendicularly piercing the center point of the face of the apparatus pierces the central region of the reflector field. The reflected sunrays striking the apparatus are not parallel but may deviate with respect to the said straight line up to half the angle $\alpha$, which angle $\alpha$ is formed by the two edge rays 6 and 7. FIG. 2 shows the elevation of an embodiment of the apparatus according to the invention, and FIG. 3 shows a section along the line III—III of FIG. 2. Between two plates 8 and 9, which are held spaced via spacer bolts 10, there extend a number of quartz glass pipes 11.

The plates 8 and 9, respectively, are secured by means of screws 12 to the ends of the spacer bolts 10. Provided in the plates 8 and 9 are a corresponding number of holes 13 and 14, respectively (see FIG. 4) in order that air may be supplied to the quartz glass pipes 11 and the heated air may be exhausted from these quartz glass pipes, respectively. Situated beneath the plate 9 is a hood 15, which is connected to a supply pipe 16. The edge of the large opening of the hood 15 is connected gas-tight to the plate 9, so that the air supplied via the supply pipe 16 penetrates into the individual quartz glass pipes 11. Situated above the plate 8 is a hood 17, which is connected to an exhaust pipe 18. The edge of the large opening of the hood 17 is connected gas-tight to the plate 8, so that the heated air exiting from the quartz glass pipes 11 can be collected and exhausted through the exhaust pipe 18.

Since it is not provided for to expose the hoods 15 and 16 and the plates 8 and 9 to the concentrated solar irradiation, these parts may be made of metal. The principle of the mounting of the individual quartz glass pipes 11 is apparent from FIGS. 4 and 5, respectively, which show corresponding details from FIG. 2 on a larger scale.

Figure 4:
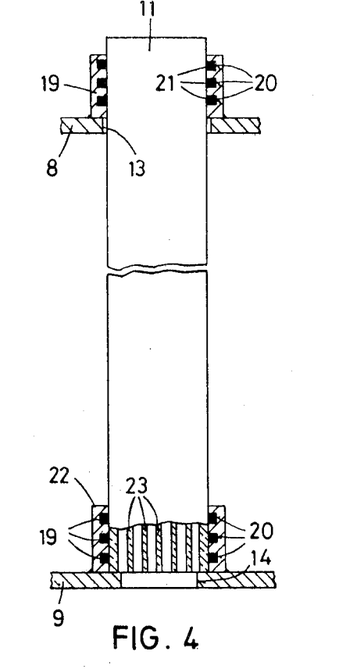
FIG. 4 shows details from FIG. 2 on a larger scale, which details show the mounting of quartz glass pipes of the apparatus according to the invention.

According to FIG. 4, the diameter of the holes 13 in the upper plate 8 is greater than the diameter of the quartz glass pipes 11. Pipe pieces 91 are secured on the top side of the plate 8. Each quartz glass pipe 11 extends through one of the holes 13 and through the corresponding pipe piece 19. Sunk into the inside of the pipe pieces 19 are grooves 20 in which sealing rings 21 are disposed. These sealing rings may be of the same kind as the piston rings of a combustion engine. The sealing rings 21 prevent air from leaving the apparatus and yet make possible the relative displacement between the quartz glass pipe 11 and the plate 8 caused by the differing coefficient of thermal expansion.

The diameter of the holes 14 in the lower plate 9 is less than the inside diameter of the quartz glass pipes 11. Concentrically with each of the holes 14, a pipe piece 22 each is secured on the top side of the plate 9. Through each pipe piece 22 extends one of the quartz glass pipes 11, so that the end face thereof rests upon the plate 9. Likewise provided on the inside of the pipe pieces 22 are grooves 20 in which sealing rings 21 are situated in order to prevent air from leaving the apparatus.

Figure 6:
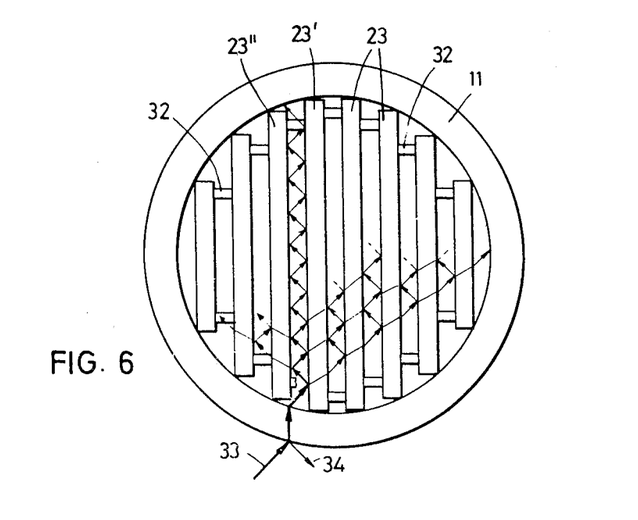
FIG. 6 shows a cross-section through one of the quartz glass pipes of the apparatus according to FIG. 2.

Within the quartz glass pipe 11 a number of glass strips 23 are disposed, as is described in more detail further on with reference to FIG. 6. Parts of the lower end faces of the glass strips 23 rest upon the edge area of the holes 14 in the lower plate 9. Thus, they cannot fall out of the quartz glass pipes 11.

Figure 5:
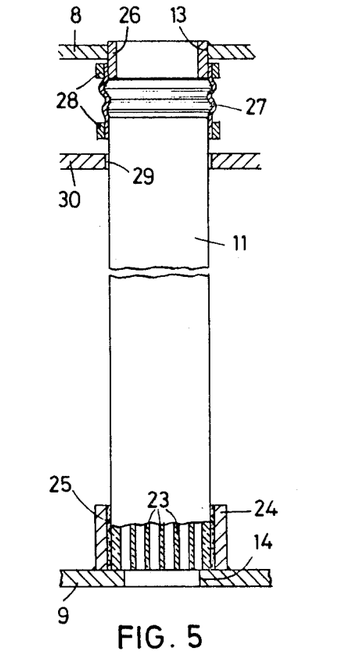
FIG. 5 shows details from FIG. 2 on a larger scale, which details show a different form of the mounting of quartz glass pipes of the apparatus according to the invention.

FIG. 5 shows another type of mounting of the quartz glass pipes 11. The diameter of the holes 14 in the lower plate 9 is less than the inside diameter of the quartz glass pipe 11. Pipe pieces 24 are welded to the plate 9 concentrically with the holes 14. The inside diameter of the pipe pieces 24 is greater than the outside diameter of the quartz glass pipes, so that the quartz glass pipes are held in the pipe pieces 24 with the aid of a heatresistant bonding agent 25, the connection thus produced also being gas-tight. Welded into the holes 13 of the upper plate 8 are pipe pieces 26 which exhibit the same outside diameter as the quartz glass pipes 11. The ends of a sleeve 27 are slipped over the quartz glass pipe 11, on the one hand, and over the part of the pipe piece 26 projecting downwardly beyond the plate 8, on the other hand. By means of clamping rings 28, the ends of the sleeve 27 are held to the pipe piece 26 and quartz glass pipe 11, respectively, surrounded by it. The sleeve 27 forms a gas-tight connection between the quartz glass pipe 11 and the interior space of the upper hood 17. The sleeve 27 compensates in addition for the temperature-dependent differing linear expansions of the quartz glass pipe 11 and of the distance between the plates 8 and 9. For reasons of safety, a guide plate 30 provided with holes 29 may be disposed beneath the sleeve 27, which plate prevents the quartz glass pipe 11 from tipping over.

FIG. 3 shows a section through the apparatus according to FIG. 2 along the line III—III. Accordingly, essentially only the quartz glass pipes 11, the lower plate 9, and the lower hood 15 with the rearwardly directed supply pipe 16 are visible. The quartz glass pipes 11 are disposed in two rows, the quartz glass pipes of the rear row being staggered with respect to the front quartz glass pipes. The major portion of the concentrated solar radiation strikes into the apparatus according to FIG. 3 in the direction of the arrow 31. By means of the staggered arrangement of the quartz glass pipes 11, those rays which pass between the front quartz glass pipes 11 are also seized. Although only two rows of quartz glass pipes 11 are drawn in FIG. 3, embodiments with three or more rows may be provided for.

The glass bodies or glass strips 23 which are disposed within the quartz glass pipes 11 and are very essential to the invention have not been drawn in in FIG. 3.

If only one or two rows of quartz glass pipes 11 are provided for, it is advantageous to dispose a reflector 31 behind these quartz glass pipes which reflects back into the quartz glass pipes 11 the portion of rays possibly exiting to the rear from the quartz glass pipes.

From FIG. 6 a first possible arrangement of the glass strips 23 within the quartz glass pipe 11 is depicted. The individual glass strips 23 are kept spaced by spacers 32 of glass. These spacers 32 do not extend over the entire length of the glass strips but are square or round disks, the thickness of which determines the distance between the adjacent glass strips 23. The spacers 32 are evenly distributed along the entire length of the glass strips 23 and made fast, for example, by fusion, to one of the two adjacent glass strips.

In transverse direction, the glass strips 23 are so aligned in the quartz glass pipes 11 that they form an acute angle of 20° to 70° to the direction indicated by the arrow 31 in FIG. 3. The glass strips 23 are lightly tinted and only partially absorb the energy of the solar radiation passing through them.

With reference to FIG. 6, the mode of operation of the apparatus according to FIG. 2 is described below. A beam of rays 33 strikes the quartz glass pipe 11 from outside. A negligible portion of the beam of rays 33 is reflected at the outer surface of the quartz glass pipe 11, as is indicated by an arrow 34. The major portion of the beam of rays 33 is refracted by the wall of the quartz glass pipe 11, and at the inner surface of the quartz glass pipe a refraction takes place once more before the beam of light enters the interior of the quartz glass pipe 11. The quartz glass of which the quartz glass pipes 11 consist absorbs as little heat energy as possible so that practically all the energy of the beam of light reaches the interior of the quartz glass pipe 11. Thereafter, the beam of light strikes one of the glass strips 23', part of the beam of light striking the glass strip 23' is reflected by the latter, and the other part penetrates the glass strip 23'. Because the glass strips 23' are lightly tinted, a portion of the energy, for example, 3 to 15% of the beam of light penetrating the glass strip 23' is absorbed in the glass strip 23'. The portion of the beam of rays which exits from the glass strip 23' strikes the next glass strip, whereupon once again a part reflects, a portion of the energy absorbs, and part of the beam of light again exits from this next glass strip. The remaining beam of light exiting from this glass strip strikes one of the glass strips 23 anew, the process described above being repeated again and again. The part of the beam of light reflected by the glass strip 23" again strikes the glass strip 23', the process described above likewise being repeated.

For easier viewing, only some few reflection locations and passage locations of the beam of light are depicted in FIG. 6. Heating of the glass strips 23 occurs only at the passage locations, these being distributed by the many reflection locations over the entire region of volume of the glass strips 23. For this reason, the glass strips 23 are heated uniformly at all locations but not overheated at any location. The energy irradiated into the interior of the quartz glass pipe 11 is not fully absorbed at the first location impinging on a body but gradually absorbed successively distributed over a plurality of locations, the plurality of locations being heated only to a temperature of, for example, 1000° C., but not to a much higher temperature.

The heat absorbed by the glass strips 23 is absorbed and carried off by a current of air which is led through the quartz glass pipe 11 and in between the glass strips 23. In the known apparatus, the wall heated by the solar radiation is brought into contact with air only on one side. In the apparatus described above, the glass strips 23 are brought into contact with the flow of air on both sides, the result of which is a substantially better heat transfer from the glass strips to the air.

In FIG. 6, for the sake of simplicity, only some few glass strips 23 are depicted. In reality, in an apparatus capable of processing radiant energy of 5 MW, ten quartz glass pipes 11 with an outside diameter of 25 cm., a wall thickness of 5 mm., and an effective length of 2.5 m. are provided for in the front row. In the second row, accordingly, nine quartz glass pipes of the same dimensions are disposed. Quartz glass pipes of this kind readily withstand an internal pressure of 100 psi at an operating temperature of 1000° C.

Within a quartz glass pipe 11 are disposed, for example, twenty-five glass strips 22 with a thickness of 5 mm., there being a spacing of 5 mm. between adjacent glass strips 23. Thus, the average overall surface area per glass strip 23 amounts to 0.24 m.$\times$2.5 m.$\times\sqrt{2}\times 2=0.78$ m$^2$. The entire surface area of the glass strips 23 per quartz glass pipe 11 amounts to 0.78 m$^2\times 25=19.5$ m$^2$. Accordingly, the total surface area of the entirety of all glass strips is $19\times 19.5$ m$^2=370$ m$^2$. This represents the whole cooling surface of the apparatus, via which the heat exchange between the glass strips 23 and the air flowing through takes place.

In the present example, there must be transferred per square meter of the cooling surface 5,000,000 W/370 m$^2=13,500$ W/m$^2$. With a moderate air current, a heat transfer of 30 W/m$^{2°}$ C. may be reckoned with. If, therefore, as in the present example, 13,500 W are supposed to be transferred per m$^2$, an average difference in temperature of about 450° C. between the glass strips 23 and the air flowing through between the same is necessary for that purpose. These figures show that it is very well possible to heat the air to about 600° to 800° C. without the temperature at any location of the apparatus becoming higher than 1,050° to 1,250° C. at such time. These values can be lowered by somewhat increasing the rate of flow of the air current. The same effect also ensues when the number of glass strips 23 per quartz glass pipe 11 is raised or the number of quartz glass pipes is itself increased.

The concentrated sunrays striking the apparatus according to FIG. 2 are limited to the region bounded by the dashed line 35, the area of this region amounting to 2.5 m.$\times$2.5 m. equal to about 6 m$^2$. In order to insolate the above-stated power of 5 MW onto the area of the active region, a power density of 836 kW/m$^2$ is necessary, which corresponds to a concentration of the solar radiation of about 1000.

Figure 7:
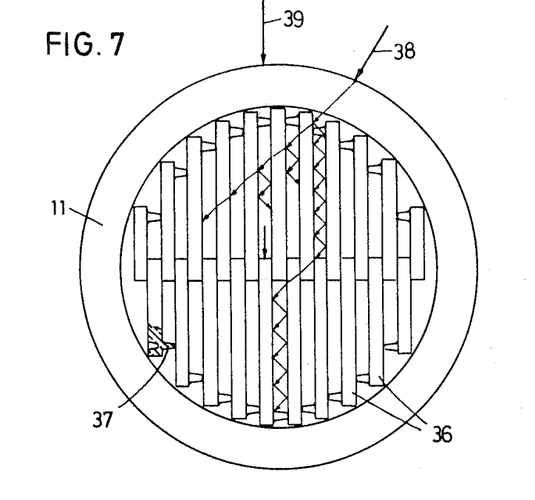
FIG. 7 shows a cross-section through a second embodiment of one of the quartz glass pipes of the apparatus according to FIG. 2.

FIG. 7 shows a second example of an embodiment of glass strips 36, which are disposed in a quartz glass pipe 11. In the transverse direction, the individual glass strips 36 extend somewhat beyond the middle of the quartz glass pipe 11, so that the adjacent glass strips 36 overlap each other some few mm. In the overlapping region of the glass strips 36 keep themselves spaced. In the outer region of the glass strips 36, instead of the spacers 33 according to the embodiment in conformity with FIG. 6, humps 37 are provided which were formed in that depressions were pressed into the glass strips 36 with a non-depicted object while the glass strips were still in the soft state. One of these humps 37 is depicted in section.

A beam of rays 38 striking the quartz glass is, similarly to the beam of rays 33 in FIG. 6, reflected again and again and gradually absorbed by the glass strips. The advantage of this embodiment as compared with that of FIG. 6 is that beams of rays 39 possibly directed parallel to the plates cannot readily pass through the quartz glass pipe 11 but are absorbed by the mutually staggered glass panes 36.

Figure 8:
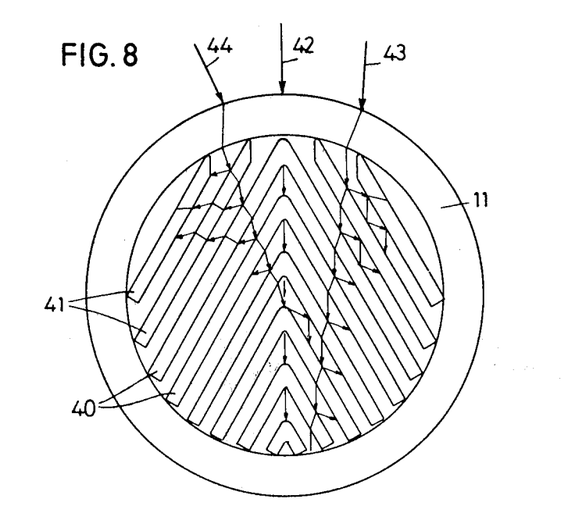
FIG. 8 shows a cross-section through a third embodiment of one of the quartz glass pipes of the apparatus according to FIG. 2.

FIG. 8 shows a further embodiment of glass strips 40 and 41 disposed within a quartz glass pipe 11. The cross-section of the majority of the glass strips 40 is angular, and only those glass strips 41 which serve to fill up the remaining part of the cross-section of the interior space of the quartz glass pipe 11 are flat glass strips. The angle formed by the glass strips 40 is an acute angle, preferably 60°. The glass strips 40 and 41 can be kept spaced from one another either by spacers depicted in FIG. 6 or by humps depicted in FIG. 7. These spacing elements are not depicted in FIG. 8. The flat glass strips 41 are beveled at the end exposed to the radiation in order that the portions of rays reflected by the narrow side reach the interior of the quartz glass pipe 11. The glass strips 40 are directed in such a way that the apex of the angle they form points in the direction of the source of rays. Beams of rays 42 impinging exactly on the apex of the said angle are gradually absorbed by the vertex regions of the glass strips 40 in succession. An offset beam of rays 43 running parallel thereto is, like the beam of rays 33 according to FIG. 6, reflected again and again and likewise gradually absorbed by the glass strips 40 and 41. A beam of rays 44 striking obliquely is, as depicted, likewise reflected again and again and gradually absorbed.

Figure 9:
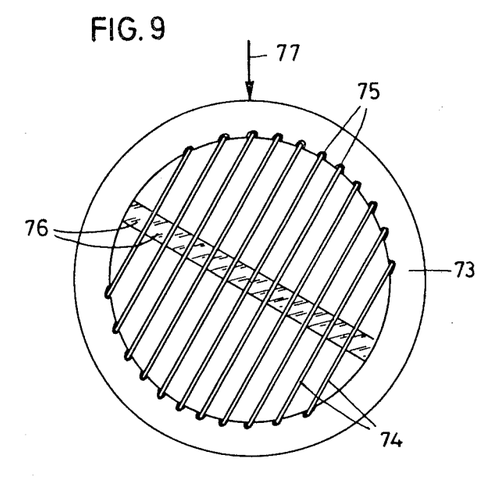
FIG. 9 shows a cross-section through a fourth embodiment of a quartz glass pipe of the apparatus according to FIG. 2.

In the embodiment of a quartz glass pipe 73 depicted in FIG. 9, there are provided, instead of glass strips, a plurality of mica strips 74, the longitudinal edges of which are held in grooves 75 sunk in the inside surface of the quartz glass pipe 73. The middle regions of the mica strips 74 are spaced by glass rods 76 having a rectangular cross-section. The mica strips 74 are produced from muscovite, and which is commercially available under the designation "Phogopit," is produced by the firm Mineral A. G. Schwyz, CH.

The mica strips are partially permeable to the solar radiation, which is indicated by the arrow 77, so that the solar radiation, similarly as in the case of the glass strips 23 of the embodiment in FIG. 6, reflected again and again and distributed over all mica strips 74, is absorbed by the latter. Because the mica strips 74 are more heatresistant than the glass strips, a higher operating temperature can be attained.

Figure 10:
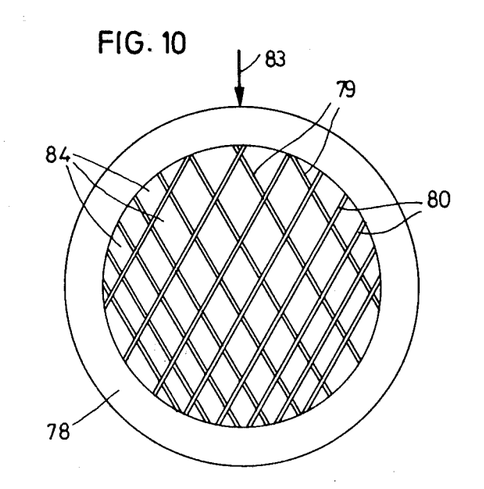
FIG. 10 shows a cross-section through a fifth embodiment of a quartz glass pipe of the apparatus according to FIG. 2.

FIG. 10 shows the preferred further embodiment. Within the quartz glass pipe 78, a honeycomb-shaped structure of mica strips 79 and 80 is disposed. A place of intersection of the honeycomb-shaped structure is depicted enlarged in FIG. 11. At certain intervals, slots 81 and 82 are sunk in the mica strips 79 and 80, respectively. The depth of the slots 81 and 82 amounts to one-quarter of the width of the mica strips. With strips of this kind, honeycomb-shaped structures of any desired length can be produced, which, like the glass strips 23 depicted in FIGS. 4 and 5, extend practically over the entire length of the quartz glass pipes.

Figure 11:
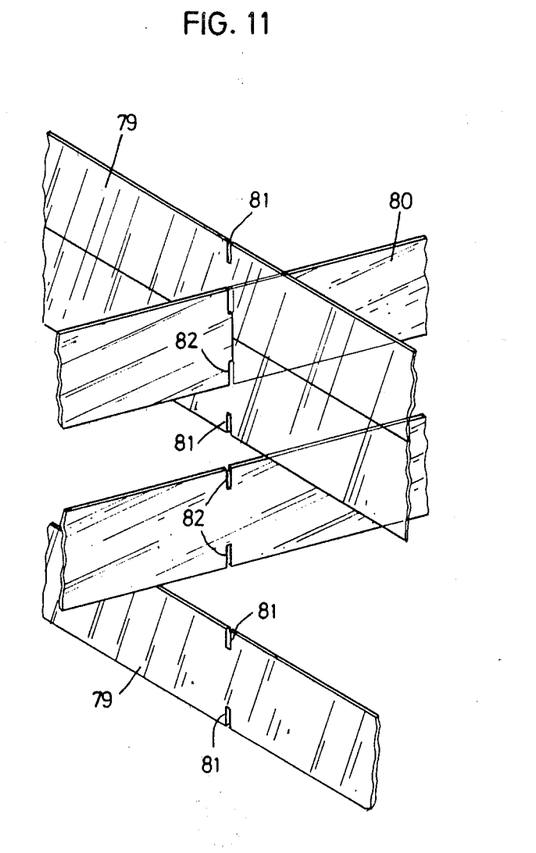
FIG. 11 shows the perspective representation of a place of intersection of the structure within the quartz glass pipe according to FIG. 10, drawn on a large scale.

Advantageously, the intervals in the longitudinal direction of the mica strips are not equal but become closer and closer from one end of the strips to the other end. It is thereby achieved that the "density" of the honeycomb-shaped structure is greater in one part than in another part. The radiation indicated by an arrow 83 is directed at that region of the honeycomb-shaped structure which exhibits the lesser "density".

The mica strips 79 and 80 are disposed in such a way that they bound a plurality of channels 84 which essentially exhibit a rhombus-shaped cross-section. One of those corners which form an acute angle points toward the direction of irradiation. In this way, more favorable reflection conditions ensue.

Figure 12:
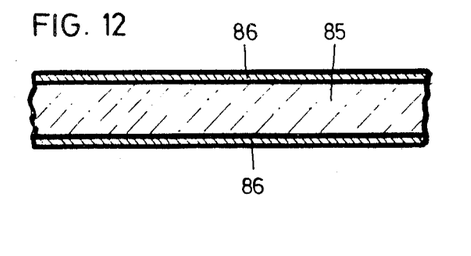
FIG. 12 shows a cross-section through a quartz glass strip which is provided on each of both sides with a coating partially absorbing the solar radiation.

FIG. 12 shows a cross-section through part of a quartz glass strip 85 which is used instead of the lightly dyed glass strips 23, 36, or 40, corresponding to the embodiments according to FIGS. 6, 7, and 8, respectively. The quartz glass strip 85 is more advantageous than the dyed glass strips 23, 36, or 40 because the quartz glass strip 85 is able to withstand higher temperatures. Since quartz glass cannot readily be dyed, on the surface of the quartz glass strip 85 is provided with a thin coating 86 only partially absorbing the solar radiation. This coating 86 is depicted overly thick in FIG. 12. Suitable as coating 86 is a very thin metal coating, e.g., of gold, which metal coating is so thin that only about 3% of the solar radiation is absorbed in this metal coating. The heat absorbed by the coating 86 is transmitted to the air flowing around this coating. The quartz glass strips 85 serve essentially only as supports for the coating 86 and can therefore be chosen less thick than the glass strips 23, 36 or 40. Quartz glass strips can also be used that are coated only one side. In this case, it is then more favorable if this one coating is chosen somewhat thicker so that about 5% of the solar radiation passing through it is absorbed.

Figure 13:
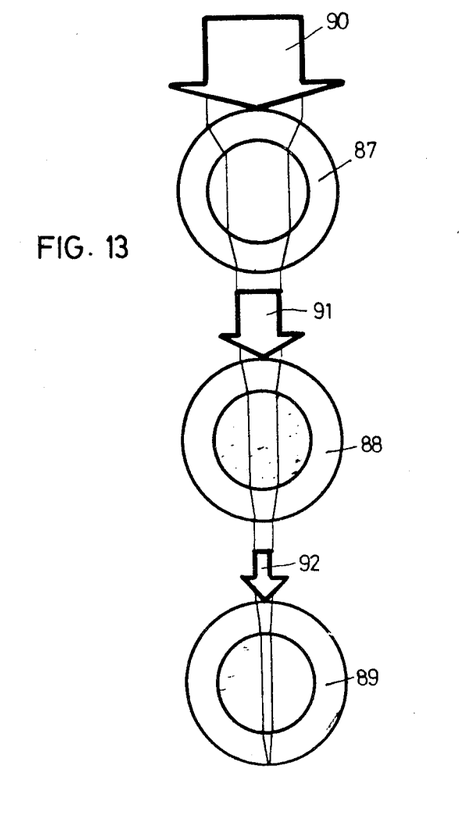
FIG. 13 shows the schematic representation of the partial absorption of the solar radiation by the walls of successively disposed glass pipes of lightly tinted glass.

In FIG. 13, the step-by-step absorption of solar radiation in the walls of successively disposed glass pipes 87, 88, and 89 of lightly tinted glass is schematically represented. The solar radiation striking into the first glass pipe 87 is represented by the arrow 90, the insolated energy being indicated by the width of the arrow 90. Upon entrance of the radiation, part of the same is absorbed in the upper wall portion of the first glass pipe 87, and a further part of the radiation is absorbed in the lower wall portion of the glass pipe upon exiting of the radiation from the glass pipe. The portion of the solar radiation reaching the second glass pipe 88 is indicated by the arrow 91. The upper and lower wall portions of the second glass pipe 88 once again absorb part of the solar radiation, so that only a small portion of the solar radiation, indicated by the arrow 92, still reaches the third glass pipe 89.

Through the partial absorption of the solar radiation, the glass pipes are heated, and the heat is carried off by an air flow inside the glass pipes 87, 88, and 89. The number of glass pipes, disposed one behind the other in the direction of the concentrated sunrays, is obviously not limited to three.

Figure 14:
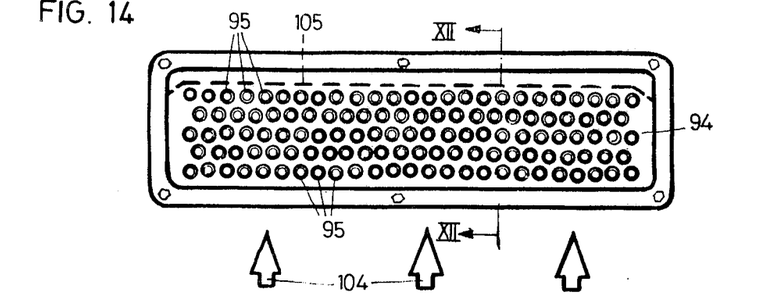
FIG. 14 shows a cross-section through a further example of an embodiment of the apparatus according to the invention.
Figure 15:
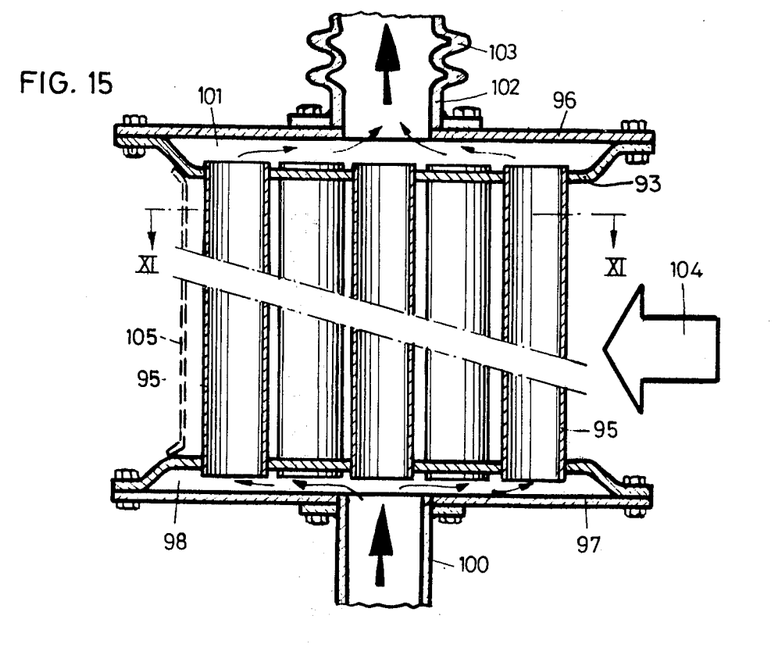
FIG. 15 shows a section along the line XII—XII of FIG. 14, drawn on a larger scale.

FIGS. 14 and 15 shows a further preferred example of an embodiment of the apparatus according to the invention. FIG. 15 shows a section along the line XII—XII of FIG. 14, drawn on a larger scale, and FIG. 14 shows a section along the line XI—XI of FIG. 15, drawn on a correspondingly smaller scale.

Between an upper plate 93 and a lower plate 94 there extend a plurality of glass pipes 95 of lightly tinted glass disposed, for example, in five rows. Into the ends of the glass pipes 95 extend holes in the plates 93 and 94, respectively, and are connected gas-tight to the latter. The peripheral regions of the upper plate 93 are bent upwardly and the peripheral regions of the lower plate 94 are bent downwardly and screwed to outer plates 96 and 97, respectively. The hollow space 98 bounded by the outer plate 97 and the lower plate 94 serves to distribute the air flowing into the space 98 via a supply pipe 99 into the individual glass pipes 95. The hollow space 101 bounded by the outer plate 96 and the upper plate 93 serves to collect the air flowing through the glass pipes 95 and heated therein. The air collected in the hollow space 101 is exhausted via an exhaust pipe 102. To compensate for the distance, dependent upon the temperature of the glass pipes 95, between the two outer plates 96 and 97, a piece 103 of the exhaust pipe 102 is formed like a bellows.

The heat absorbed by the glass pipes 95 is transmitted to the air flowing through them. At such time, this air is heated to about 800° C. Comparatively to the apparatus depicted in FIGS. 2 and 3, the apparatus according to FIGS. 14 and 15 exhibits a substantially greater number of glass pipes 95, the diameter of which is less than the diameter of the quartz glass pipes 11. Hence the air can be admitted to the glass pipes 95 at a substantially higher pressure than is the case with the quartz glass pipes 11.

The concentrated solar radiation is directed at the face of the apparatus, the radiation represented by the arrow 104 striking the glass pipes 95 for the most part approximately perpendicularly. Thereupon, similarly as depicted in FIGS. 6 to 8, multiple reflections are produced of portions of radiation which are absorbed by the glass pipes 95. Should small portions of radiation get through the arrangement of glass pipes 95, a reflector 105, which is depicted in dashed lines in FIGS. 14 and 15, can be disposed at the back of the glass pipe arrangement. By means of this reflector, the portions of radiation exiting at the back of the glass pipe arrangement are reflected back into the glass pipe arrangement again.

Figure 16:
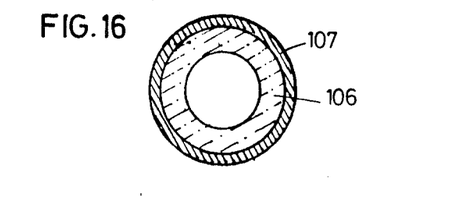
FIG. 16 shows a transverse cross-section through a modification of the glass pipe of the apparatus according to FIG. 12 and which may be employed in the apparatus of FIGS. 14 and 15, which glass pipe is provided on the outside with a layer partially absorbing the solar radiation.

Instead of the tinted glass pipes 95, quartz glass pipes 106 can also be used, one of which is depicted in cross-section in FIG. 16. The outside of the quartz glass pipe 106 is provided with a coating 107 partially absorbing the solar radiation. The thickness of the coating 107 is depicted greatly exaggerated in FIG. 16. The advantage of the coated quartz glass pipes 106 is that they are able to withstand higher temperatures than the tinted glass pipes 95 and that the air can thus be heated to a higher temperature. The coating 107 is the same as the coating 86 described with reference to FIG. 12.

Figure 17:
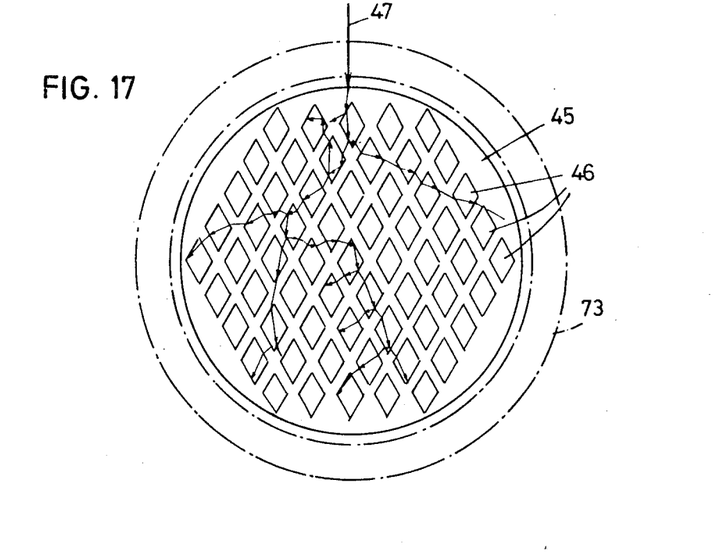
FIG. 17 shows a cross-section through an elongated glass body with a plurality of parallel-running passage channels, which glass body is usable instead of the quartz glass pipes in the apparatus according to FIG. 2.

In FIG. 17, a glass rod 45 of round cross-section is depicted. The glass of which the glass rod 45 consists is lightly tinted in order to absorb gradually the solar radiation entering it. Inside the glass rod 45 there extend longitudinal channels 46, running practically parallel, for the passage of the air to be heated. The cross-section of these channels can fundamentally exhibit any desired shape, but preferably these cross-sections are rhombus-shaped. The acute angles of the rhombus-shaped channels facing the main direction of radiation form an angle of 60°. A beam of rays 47 which strikes the glass rod 45 is, as depicted in a very simplified way in FIG. 12, reflected in a very multifarious manner and gradually absorbed at a plurality of locations inside the glass rod. Since all longitudinal channels 46 are closed, the quartz glass pipe surrounding the glass rod can be dispensed with in the simple case. In this case, the glass rod 46 is inserted in the apparatus according to FIG. 2 similarly as depicted in FIGS. 4 and 5.

Figure 18:
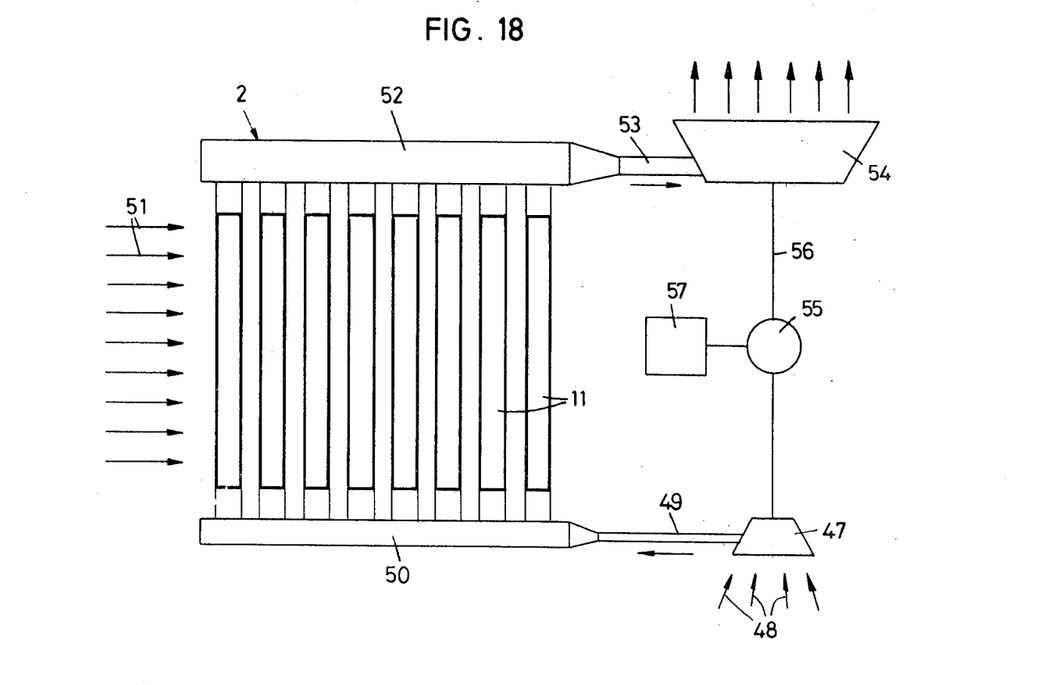
FIG. 18 shows the fundamental representation of the use of the apparatus according to FIG. 2 in a solar power plant installation.

FIG. 18 shows the principle of a solar power plant in a highly simplified form. The ray receiver 2 may be an apparatus according to FIG. 2. By means of a compressor 47, air indicated by arrows 48 is drawn in and supplied via a supply pipe 49 to a distributor 50 which corresponds to the lower hood 15 of the apparatus according to FIG. 2. From the distributor 50, the air arrives in the quartz glass pipes 11 having glass strips disposed according to FIGS. 6, 7, or 8. Instead of the quartz glass pipes 11, glass rods 45 according to FIG. 12 may also be used. In the quartz glass pipe 11 exposed to solar radiation indicated by the arrows 51, the air is heated and collected in a collector 52, which corresponds to the upper hood 17 in the apparatus according to FIG. 2, and supplied to a gas turbine via an exhaust pipe 53. The rotors of the gas turbine 54, of the compressor 47, and of a generator 55 are fixed to a common shaft 56, so that the gas turbine 54 drives the compressor 47 and the generator 55. The difference of the mechanical output indicated by the turbine 54 less the drive power of the compressor 47 is converted into electric power in the generator 45 and supplied to a symbolically represented distributing network 57.

Figure 19:
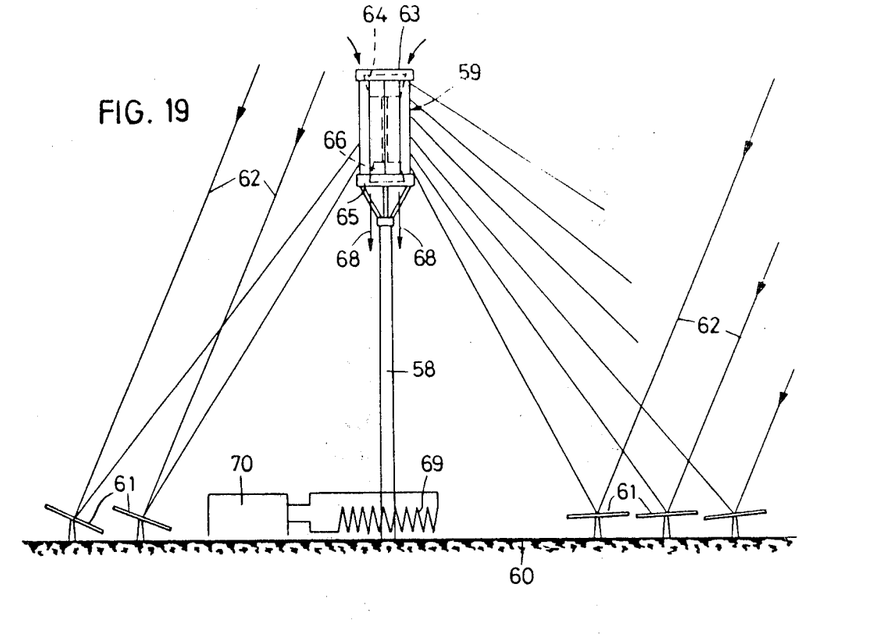
FIG. 19 shows the simplified representation of a solar power plant with a tower, in the upper region of which ray receivers are disposed which are shone upon from all sides by reflectors disposed on the ground.
Figure 20:
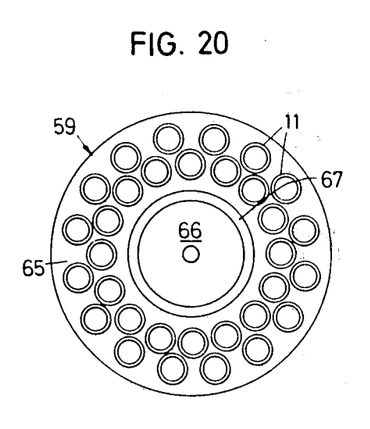
FIG. 20 shows a cross-section through the upper region of the tower of the solar power plant according to FIG. 19.

FIG. 19 shows another solar power plant schematically and in a greatly simplified representation. A cylindrically formed ray receiver 59 is disposed on a tower 58. Set up on the ground 60 and round about the tower 58 are reflectors 61 which reflect the incident sunrays 62 onto the ray receiver 59, whereby a thousand- to two-thousand-fold concentrated solar radiation strikes the ray receiver 59. At the very top there is situated an annularly formed distributor 63 for supplying the air compressed by a compressor 64 disposed inside the ray receiver 59 to the quartz glass pipes 11 depicted in cross-section in FIG. 20, disposed along concentric circular lines. The air heated in the quartz glass pipes 11 is collected in a likewise annularly formed collector 65 and supplied to a gas turbine 66 disposed inside the ray receiver 59. The distributor 63 and the collector 65 are kept spaced by a hollow cylinder 67. The generated surface of the hollow cylinder 67 is polished, so that the hollow cylinder 67 simultaneously serves as a reflector for the portions of radiation possibly passing toward the inside through the quartz glass pipes 11.

The air to be heated is drawn by the compressor 64 from above through the annular distributor 63, pressed through the quartz glass pipes 11 and at such time heated, and collected in the collector 65, and supplied to the gas turbine 66. The air only partially cooled in the gas turbine 66 is expelled downwardly in the direction of the arrows 68.

If the air supplied to the gas turbine 66 exhibits, for example, a temperature of 800° C., then the temperature of the air expelled from the gas turbine 66 amounts to about 300° to 400° C. This still quite hot current of air is supplied to a heat exchanger 69 for better exploitation of the solar energy. In this heat exchanger, water is vaporized and the steam produced is heated to a temperature of about 300° C. This steam is routed to a steam turbine 70 which, in turn, drives a non-depicted further generator.

Figure 21:
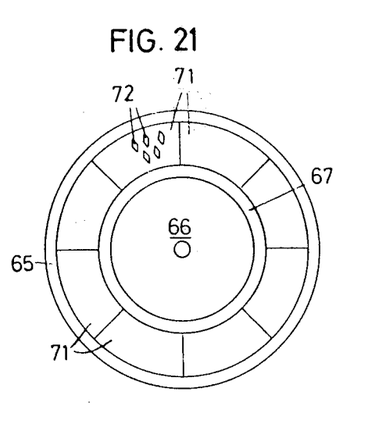
FIG. 21 shows a cross-section through the upper part of the tower according to FIG. 19, the ray receivers being formed differently from those depicted in FIG. 20.

FIG. 21 shows a cross-section through a second embodiment of the ray receiver 59, the latter differs with respect to the one depicted in FIG. 17 merely in that glass body segments 71 are used instead of the quartz glass pipes 11. The glass body segments 71 exhibit, similarly to the glass rod 45 according to FIG. 9, longitudinal channels 72. The longitudinal channels 72 have a rhombus-shaped cross-section, the longer diagonal being radially directed.

When the generated surface of the glass rod 45 according to FIG. 17 is likewise supposed to be utilized for heat transfer to the air, then the glass rod 45 is disposed within a quartz glass cylinder 72, the inside diameter of which is greater than the outside diameter of the glass rod 45, so that the air to be heated also flows around the generated surface of the glass rod 45.

The fundamental principle of the apparatus according to FIG. 2 can also be used for driving stroke-piston or rotary-piston engines.

The advantage of the above-described apparatuses for heating a transparent, gaseous medium by means of concentrated solar radiation consists in the fact that the concentrated solar radiation is not converted into heat at the first location at which it strikes the glass strips 23, 36, 40, 41 or the glass body 45 or 71, whereupon this location would become excessively heated, but that by means of the many reflection locations the concentrated solar radiation reaches all regions of the said glass strips and glass bodies, and that the heat is absorbed gradually by the entire glass body, this glass body being heated as homogeneously as possible to the same temperature, so that no location of the glass body heats up excessively. In order to improve the uniformity of the distribution of the absorbed energy, those regions of the glass strips which are already exposed to an attenuated solar radiation can be more strongly tinted than those regions which are still exposed to the nonattenuated radiation. In the case of the glass body 45 or 71, a more homogeneous distribution of the absorbed energy can be achieved in that the size of the cross-sections of the longitudinal channels 45 and 72, respectively, decrese as viewed in the direction of radiation.

A further advantage of the above-described apparatuses is that the surface responsible for the transmission of the heat from the glass strips or the glass bodies to the gaseous medium is substantially enlarged, so that the rate of flow of the gaseous medium can be kept relatively low. The result is a lesser resistance to flow to which the current of medium is exposed.

We claim:

1. Apparatus for heating a transparent, gaseous medium by means of highly concentrated solar radiation, with first means for supplying the gaseous medium to a number of pipes which are exposed to the concentrated solar radiation, and second means for exhausting the heated gaseous medium, characterized in that the said pipes are quartz glass pipes connecting the first and second means, that a number of partially transparent bodies are disposed within each quartz glass pipe, and that spacing elements for holding the adjacent bodies are flowed around by the gaseous medium.

2. Apparatus according to claim 1, characterized in that the partially transparent bodies are made of mica.

3. Apparatus according to claim 2, characterized in that the mica bodies are mica strips disposed in honeycomb form.

4. Apparatus according to claim 1, characterized in that the partially transparent bodies are made of a material which exhibits a coefficient of absorption of 0.05 to 0.30.

5. Apparatus according to claim 1 or 4, characterized in that the quartz glass pipes exhibit a round cross-section, and that the partially transparent bodies are glass strips of tinted glass.

6. Apparatus according to claim 1 or 4, characterized in that the partially transparent bodies include glass strips having coatings and partially absorbing the solar radiation.

7. Apparatus according to claim 1 characterized in that the partially transparent bodies have planar major surfaces forming an angle of 20° to 70° with the direction of said concentrated solar radiation incident or said surfaces.

8. Apparatus according to claim 1, characterized in that said partially transparent bodies comprise tinted glass strips some of which exhibit an angular cross-section, that form an acute angle of preferably 160°.

9. Apparatus according to claim 1, characterized in that the quartz glass pipes are disposed in at least two rows, and the quartz glass pipes of the second row are staggered with respect to those of the first row so that the portion of rays passing through between the quartz glass pipes of the first row enter into the quartz glass pipes of the second row.

10. Apparatus according to claim 1 or 9, characterized in that there is disposed behind the quartz glass pipes, viewed in the direction of insolation, a reflector for reflecting onto the quartz glass pipes the portion of radiation which has pressed through the quartz glass pipes.

11. Apparatus for heating a transparent, gaseous medium by means of highly concentrated solar radiation with first means for supplying the gaseous medium to a body exposed to the concentrated solar radiation and second means for exhausting the heated medium characterized in that the said body is made of tinted glass and exhibits a plurality of approximately parallel longitudinal chennals of rhombus shaped cross-section with the longer diagonals thereof being perpendicular to the face of the apparatus running approximately for conveying the gaseous medium through, and that the first and second means communicate with each other via the longitudinal channels.

12. Apparatus for heating a transparent, gaseous medium by means of highly concentrated solar radiation, with first means for supplying the gaseous medium to a body exposed to the concentrated solar radiation and second means for exhausing the heated medium characterized in that a plurality of transversely spaced glass pipes having very thin external metalic coatings absorbent of solar radiation and extending between the first and second means and disposed in a row approximately in alignment with the incident solar radiation whereby a fraction of the solar radiation incident on each of said pipes is absorbed thereby and substantially the remainder of said incident radiation traverses said respective pipe and is incident on the next successive pipe, and that one ends of the glass pipes open into a chamber formed by the first means and the other ends of the glass pipes open into a further chamber formed by the second means.

13. Apparatus for heating a transparent, gaseous medium by means of highly concentrated solar radiation, with first means for supplying the gaseous medium to a body exposed to the concentrated radiation and second means for exhausting the heated medium, characterized in that the said body is made of tinted glass and exhibits a round cross-section and is disposed within a quartz glass pipe whose inside diameter is greater than the outside diameter of the glass body, the tinted glass body exhibiting a plurality of longitudinal channels running approximately parallel for conveying the gaseous medium therethrough, and that the first and second means communicate with each other via the longitudinal channels.

14. Apparatus for heating a transparent, gaseous medium by means of highly concentrated solar radiation with first means for supplying the gaseous medium to a body exposed to the concentrated solar radiation and second means for exhausting the heated medium, characterized in that said body is made of tinted glass and exhibits an annular segment shaped cross-section and a plurality of longitudinal channels running approximately parallel for conveying the gaseous medium there through, that individual glass bodies are joined to form a hollow cylinder, the generated surface of which is exposable all around to the concentrated solar radiation, and that the first and second means communicate with each other via the longitudinal channels.

15. A device for transferring heat from concentrated solar radiation to a transparent gaseous medium comprising a conduit having a transparent wall and exposed to said solar radiation, a plurality of transversly spaced, longitudinally extending heat absorbing elements disposed in said conduit, each absorbing a portion of the solar radiation incident thereon and transmitting and/or reflecting the remainder of said incident solar radiation to another heat absorbing element, and means for circulating said gaseous medium through said conduit along the faces of said heat absorbing elements.

16. The device of claim 15 wherein said heat absorbing element have transversly spaced confronting faces.

17. The device of claim 15 or 16 wherein said heat absorbing elements are formed of a tinted transparent material.

18. The device of claim 15 or 16 wherein said heat absorbing elements are formed of a transparent material having a semi reflecting coating.

* * * * *